US008504316B2

(12) United States Patent
Tamai et al.

(10) Patent No.: US 8,504,316 B2
(45) Date of Patent: Aug. 6, 2013

(54) FORM MEASURING INSTRUMENT, AND CALIBRATION METHOD AND CALIBRATION PROGRAM THEREFOR

(75) Inventors: Toshiyuki Tamai, Sapporo (JP); Tomonori Goto, Sapporo (JP)

(73) Assignee: Mitutoyo Corporation, Kawasaki (JP)

( * ) Notice: Subject to any disclaimer, the term of this patent is extended or adjusted under 35 U.S.C. 154(b) by 678 days.

(21) Appl. No.: 12/662,737

(22) Filed: Apr. 30, 2010

(65) Prior Publication Data

US 2010/0292946 A1    Nov. 18, 2010

(30) Foreign Application Priority Data

May 18, 2009    (JP) ................................ 2009-120327

(51) Int. Cl.
*G06F 19/00* (2011.01)
*G01B 1/00* (2006.01)

(52) U.S. Cl.
USPC .................................. 702/94; 33/504; 702/95

(58) Field of Classification Search
CPC ................................ B23Q 17/20; G01B 21/20
USPC .................. 702/95, 150, 151, 157, 167–169; 33/174, 503, 504, 505, 554, 569; 73/1.79, 73/104
See application file for complete search history.

(56) References Cited

U.S. PATENT DOCUMENTS

| | | | | |
|---|---|---|---|---|
| 4,070,762 A | * | 1/1978 | Siddall | ............................. 33/504 |
| 6,526,364 B2 | * | 2/2003 | Omori et al. | ..................... 702/95 |
| 2001/0008994 A1 | | 7/2001 | Omori et al. | |
| 2005/0234671 A1 | | 10/2005 | Morfino | |
| 2011/0000277 A1 | * | 1/2011 | MacManus | ..................... 73/1.79 |

FOREIGN PATENT DOCUMENTS

| | | |
|---|---|---|
| GB | 2 393 790 A | 4/2004 |
| JP | A-5-231864 | 9/1993 |
| JP | B2-2551698 | 11/1996 |

OTHER PUBLICATIONS

H. Kunzmann et al., "On Testing Coordinate Measuring Machines (CMM) with Kinematic Reference Standards (KRS)," *Annals of the CIRP*, 1983, vol. 32, No. 1, pp. 465-468.
European Search Report dated Sep. 8, 2010 in European Patent Application No. 10 16 2605.

\* cited by examiner

*Primary Examiner* — John H Le
(74) *Attorney, Agent, or Firm* — Oliff & Berridge, PLC

(57) ABSTRACT

Provided is method of calibrating Y-axis direction position of contact tip of form measuring instrument including: table rotatable about Z-axis; contact tip capable of contacting workpiece; and contact tip driving means to drive contact tip in at least X- and Z-axis directions among X-, Y- and Z-axis directions perpendicular to one another. Method performs tracing measurement of inclined surface or inclined cylinder side surface which is part of workpiece obtained by inclining workpiece placed on table about Y-axis, or side surface of off-centered cylinder having center axis off-centered in X-axis direction by rotating surface to obtain measurement value at each angular position of rotation of table, obtains angular position of rotation at which smallest value among measurement values of tracing measurement is detected as angular position of rotation with smallest detected value, and adjusts Y-axis direction position of contact tip based on angular position of rotation with smallest detected value.

10 Claims, 8 Drawing Sheets

VERTICAL POSTURE

HORIZONTAL POSTURE

⇩ Y-AXIS ADJUSTMENT

MEASURE AMOUNT OF
DISPLACEMENT Δ2 BY
ROTATING ABOUT Z-AXIS

FORM MEASURING INSTRUMENT, AND CALIBRATION METHOD AND CALIBRATION PROGRAM THEREFOR

CROSS REFERENCE TO RELATED APPLICATIONS

This application is based on and claims the benefit of priority from prior Japanese Patent Application No. 2009-120327, filed on May 18, 2009, the entire contents of which are incorporated herein by reference.

BACKGROUND OF THE INVENTION

1. Field of the Invention

The present invention relates to a form measuring instrument such as a roundness measuring machine which measures a displacement in synchronization with an angular position of rotation of a workpiece that is rotating about a specified rotation axis, and a calibration method and calibration program therefor.

2. Description of the Related Art

Conventionally, there has been known a roundness measuring machine which receives a workpiece on its table, rotates the table, and makes a contact tip (e.g., a contact piece) scan the surface of the workpiece (see JPH5-231864A, JP2551698B). Such a roundness measuring machine rotates the table to detect a displacement of the contact tip in an X-axis direction and in a Z-axis direction. That is, the roundness measuring machine performs the measurement while locking the contact tip in a Y-axis direction. Therefore, in order to obtain a highly accurate measurement, it is important to calibrate the position of the contact tip in the Y-axis direction.

Normally, calibration of the position of the contact tip in the Y-axis direction is performed in the following manner. First, a reference sphere is positioned at the center of rotation of the table, and a Y-axis direction adjustment screw of a detector holder is manually twisted while the contact tip is fixed in contact with the reference sphere. Then, the adjustment screw is stopped at a position where X-axis and Z-axis direction peaks of a level meter (X-axis and Z-axis direction peaks of the sphere) are observed.

However, the above calibration method relies only upon human perceptions and tends to generate an error. The Y-axis direction error causes errors in the angular position and X-axis position of the workpiece and in the measured values, and such errors are greater at a position more proximal to the center of rotation of the table.

For example, when there is a Y-axis direction error, a measurement of the flatness of an optical flat (having a cylindrical shape) which is performed by inclining the optical flat will result in that different inclination values will be detected at the center and at a position more distal, and that the shape of the top surface of the optical flat, which should be a flat shape by right, will be measured as a warped shape. Further, in a measurement of roundness or cylindricity, the smaller the diameter of the workpiece, at the farther position from the 0-degree position of the workpiece, the contact tip will gain contact with the workpiece. Thereby an error may be caused in an analysis calculation result, and the centering may not be converged.

SUMMARY OF THE INVENTION

A method of calibrating a form measuring instrument according to the present invention is a method of calibrating a form measuring instrument for calibrating a position of a contact tip of the form measuring instrument in a direction along a Y-axis, the form measuring instrument including: a table for placement of a workpiece thereon, the table being rotatable about a Z-axis; the contact tip capable of contacting with the workpiece; and contact tip driving means configured to drive the contact tip in directions along at least an X-axis and the Z-axis among the X-axis, the Y-axis, and the Z-axis perpendicular to one another, the method comprising: performing tracing measurement of an inclined flat surface, a side surface of an inclined cylinder, or a side surface of an off-centered cylinder by rotating the surface to obtain a measurement value at each angular position of rotation of the table, the inclined surface and the side surface of the inclined cylinder each being a part of the workpiece obtained by inclining the workpiece placed on the table about the Y-axis, the off-centered cylinder having a center axis off-centered in the direction along the X-axis; obtaining an angular position of rotation of the table at which a smallest value among the measurement values obtained by the tracing measurement is detected, as an angular position of rotation with smallest detected value; and adjusting the position of the contact tip in the direction along the Y-axis based on the angular position of rotation with smallest detected value.

A form measuring instrument according to the present invention comprises: a table for placement of a workpiece thereon, the table being rotatable about a Z-axis; a contact tip capable of contacting with the workpiece; contact tip driving means configured to drive the contact tip in directions along at least an X-axis and the Z-axis among the X-axis, a Y-axis, and the Z-axis perpendicular to one another; and a control unit operative to calibrate a position of the contact tip in a direction along the Y-axis, the control unit including: means operative to obtain an angular position of rotation of the table at which a smallest value among measurement values is detected as an angular position of rotation with smallest detected value, the measurement values being obtained by performing tracing measurement of an inclined flat surface, a side surface of an inclined cylinder, or a side surface of an off-centered cylinder by rotating the surface, the inclined surface and the side surface of the inclined cylinder each being a part of the workpiece obtained by inclining the workpiece placed on the table about the Y-axis, the off-centered cylinder having a center axis off-centered in the direction along the X-axis; and means operative to calculate an amount of adjustment by which the position of the contact tip in the direction along the Y-axis is adjusted based on the angular position of rotation with smallest detected value.

A program for calibrating a form measuring instrument according to the present invention is a program for calibrating a form measuring instrument for calibrating a position of a contact tip of the form measuring instrument in a direction along a Y-axis, the form measuring instrument including: a table for placement of a workpiece thereon, the table being rotatable about a Z-axis; the contact tip capable of contacting with the workpiece; and contact tip driving means configured to drive the contact tip in directions along at least an X-axis and the Z-axis among the X-axis, the Y-axis, and the Z-axis perpendicular to one another, the program controlling a computer to: perform tracing measurement of an inclined flat surface, a side surface of an inclined cylinder, or a side surface of an off-centered cylinder by rotating the surface to obtain a measurement value, the inclined surface and the side surface of the inclined cylinder each being a part of the workpiece obtained by inclining the workpiece placed on the table about the Y-axis, the off-centered cylinder having a center axis off-centered in the direction along the X-axis; obtain an angular position of rotation of the table at which a smallest value among obtained measurement values is detected as an angular position of rotation with smallest detected value; and calculate an amount of adjustment by which the position of the contact tip in the direction along the Y-axis is adjusted based on the angular position of rotation with smallest detected value.

DETAILED DESCRIPTION OF THE EMBODIMENTS

Next, an embodiment of the present invention will be explained with reference to the drawings.

Embodiment

Configuration of Form Measuring Instrument According to an Embodiment

Figure 1:
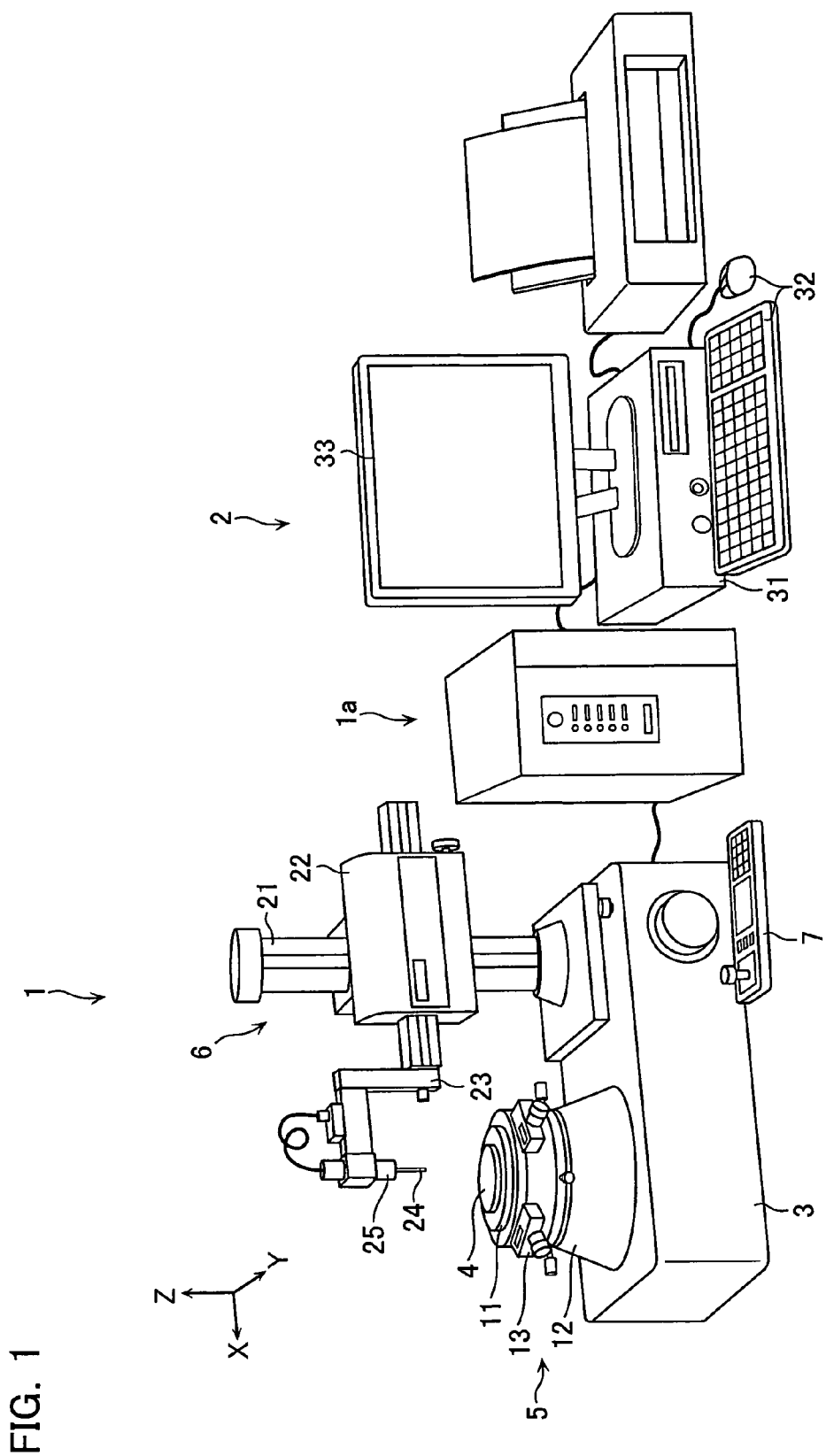
FIG. 1 is an appearance perspective diagram showing a schematic configuration of a form measuring instrument according to an embodiment of the present invention.

First, with reference to FIG. 1, the configuration of the form measuring instrument according to an embodiment will be explained. FIG. 1 is an appearance perspective view of a form measuring instrument (roundness measuring machine) according to an embodiment.

The form measuring instrument rotates a workpiece 4 formed of a rotating object about a specified rotation axis and measures a displacement of a surface of the workpiece 4 at its each angular position of rotation.

As shown in FIG. 1, the form measuring instrument includes a measuring unit 1 and an arithmetic processing device 2 connected to the measuring unit 1 via a drive control unit 1a.

The measuring unit 1 includes a base mount 3, a table 5 provided on the base mount 3 and on which a workpiece 4 is placed, a displacement detecting unit 6 configured to detect any displacement of the workpiece 4 placed on the table 5, and an operation section 7 used for operating them.

The table 5 drives a disk-shaped stage 11 to rotate by means of a rotation drive unit 12 that is positioned below the stage 11, thereby to rotate the workpiece 4 placed on the stage 11. Adjustment knobs 13 are provided on the side surface of the rotation drive unit 12 at generally 90-degree intervals in the circumferential direction. Operating these adjustment knobs 13 allows for manual centering and leveling of the stage 11. That is, the stage 11 is constructed to be adjustable in X-axis, Y-axis, and Z-axis directions perpendicular to one another. The stage 11 is also constructed such that it is centered and leveled by a control unit 41, which will be described later.

The displacement detecting unit 6 is constructed as follows. That is, a column 21 that extends upward stands on the base mount 3, and a slider 22 is mounted on the column 21 in a way to be able to move an up and down (Z-axis) direction. A detector holder 23 is attached to the slider 22. The detector holder 23 can be driven in a horizontal (X-axis) direction, and has a detector 25 provided at the end. A contact tip 24, which can bring its tip into contact the workpiece 4, is provided at the end of the detector 25. The column 21, the slider 22, the detector holder 23, and the detector 25 constitute a contact tip driving means.

By moving the slider 22 and the detector holder 23 to scan (trace) the surface of the workpiece 4 in the X-axis direction or the Z-axis direction while rotating the table 5, it is possible to the obtain an amount of displacement of the contact tip 24 at each position in the X-axis direction or the Z-axis direction as measurement data.

Figure 2:
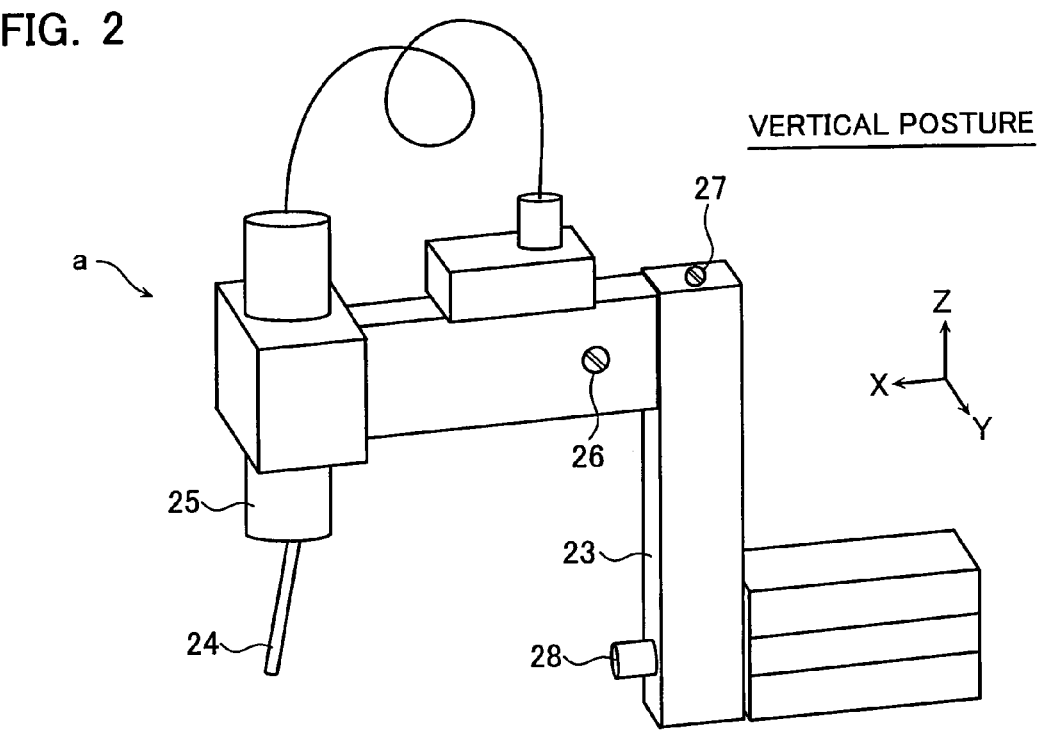
FIG. 2 is an expanded diagram of a part of a displacement detecting unit 6.
Figure 2:
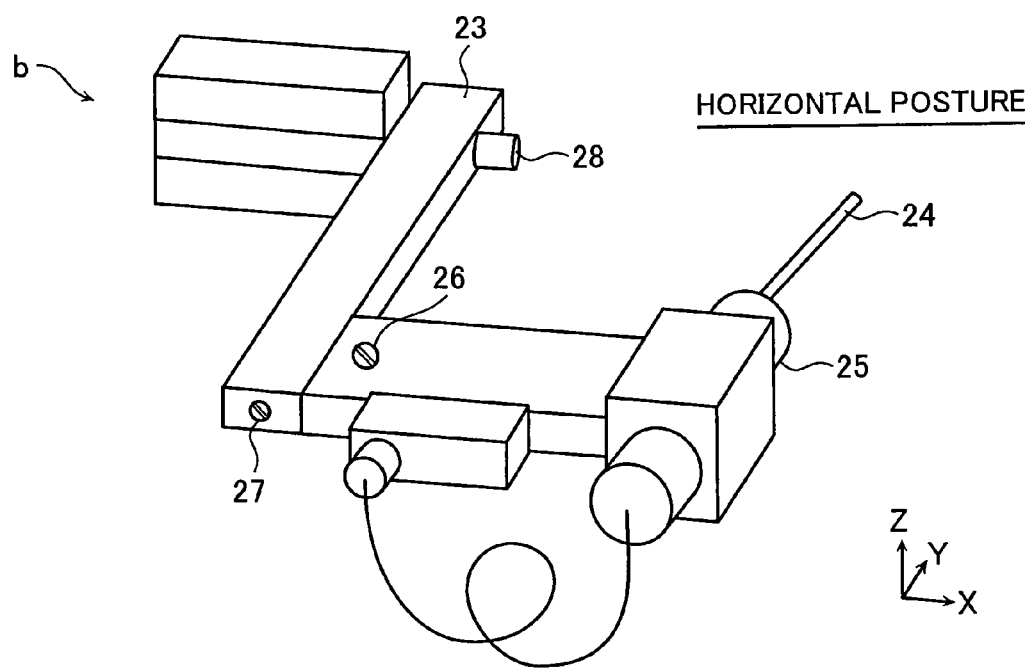

As shown in FIG. 2, the detector holder 23 can rotate by 90 degrees about a rotation shaft 28 that extends in the X-axis direction, such that the detector 25 and the contact tip 24 can take a vertical posture shown in FIG. 2 (a) and a horizontal posture shown in FIG. 2 (b) in accordance with the form and measurement surface of the workpiece 4. The position of the tip of the contact tip 24 in the Y-axis direction when the detector holder 23 is in the vertical posture can be adjusted by an adjustment screw 26 provided on a side surface of the detector holder 23. The position of the tip of the contact tip 24 in the Y-axis direction when the detector holder 23 is in the horizontal posture can be adjusted by an adjustment screw 27 provided on an end surface of the detector holder 23.

The arithmetic processing device 2 acquires measurement data obtained by the displacement detecting unit 6. The arithmetic processing device 2 includes an arithmetic processing unit 31 configured to execute arithmetic processing, an operation section 32, and a display device 33. The arithmetic processing device 2 is configured to be able to control the operation of the measuring unit 1 like the operation section 7 is.

Figure 3:
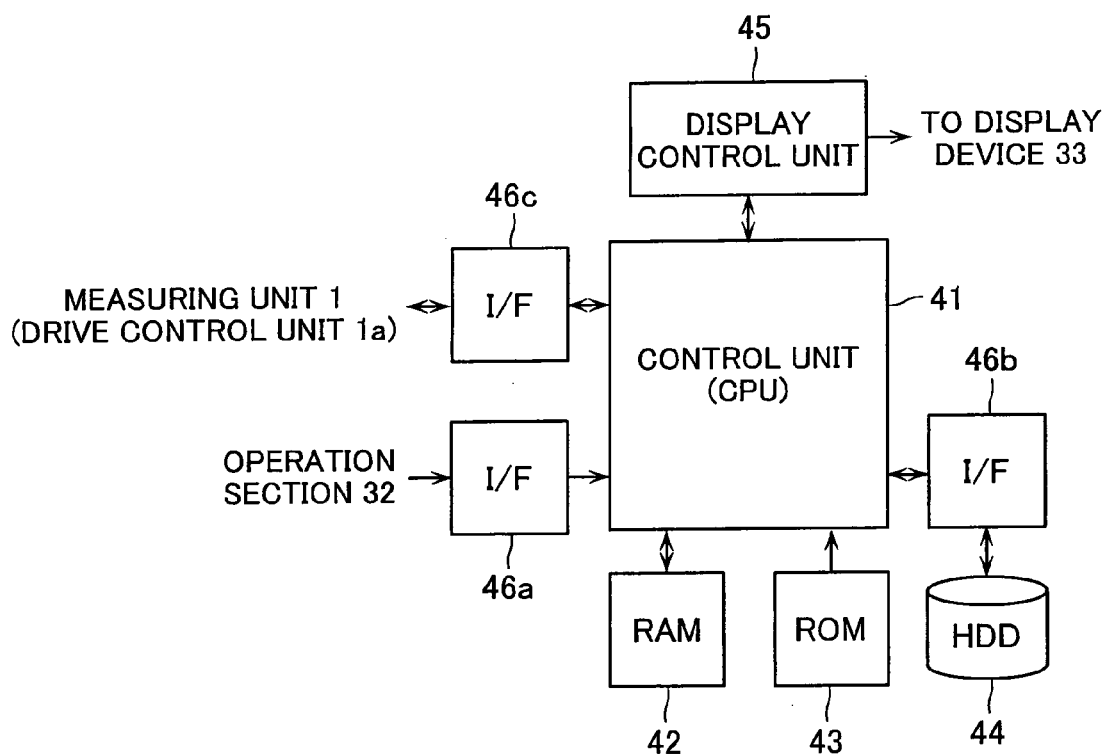
FIG. 3 is a block diagram showing a configuration of an arithmetic processing unit 31.

Next, with reference to FIG. 3, the configuration of the arithmetic processing unit 31 will be explained. As shown in FIG. 3, the arithmetic processing unit 31 mainly includes a control unit (CPU: Central Processing Unit) 41, a RAM (Random Access Memory) 42, a ROM (Read Only Memory 43, an HDD (Hard Disk Drive) 44, and a display control unit 45. In the arithmetic processing unit 31, code information and positional information entered from the operation section 32 are input to the control unit 41 via an I/F 46a. The control unit 41 executes various processes in accordance with a macro program stored in the ROM 43 and various programs that are loaded onto the RAM 42 from the HDD 44 via an I/F 46b.

The control unit 41 controls the measuring unit 1 via an I/F 46c in accordance with a measurement execution process. The HDD 44 is a recording medium that stores various control programs. The RAM 42 stores various programs and provides a work area for various processes. The control unit 41 displays a measurement result, etc. on the display device 33 via the display control unit 45.

Figure 4:
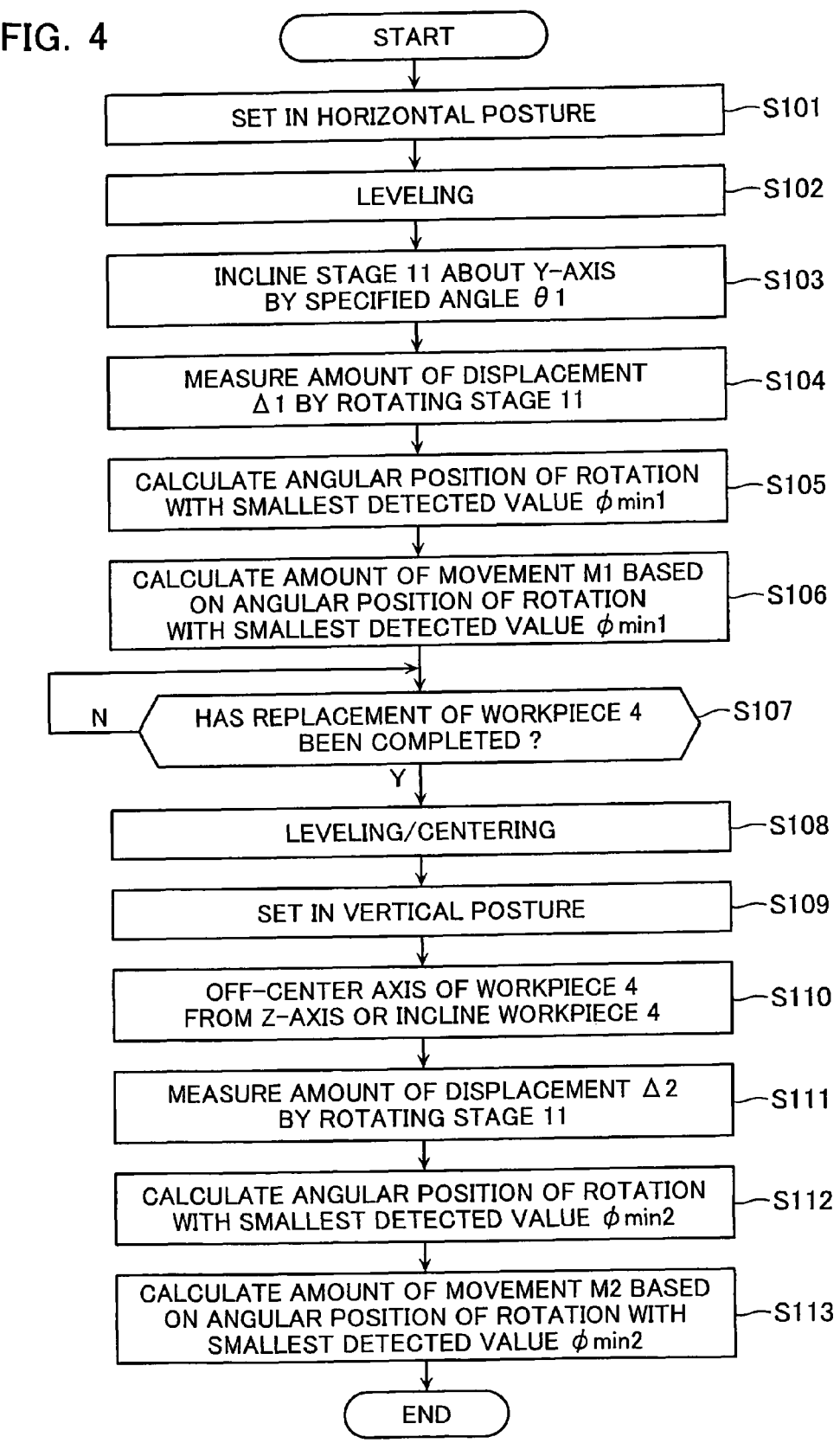
FIG. 4 is a flowchart showing an operation of the form measuring instrument according to an embodiment.

The control unit 41 reads out various programs from the HDD 44 and executes the following operation shown in FIG. 4 by executing the programs.

[Operation of Form Measuring Instrument According to Embodiment]

Next, with reference to the flowchart shown in FIG. 4, a method, according to an embodiment, of calibrating the position of the contact tip by using the form measuring instrument will be explained. The first half (steps S101 to S106) of FIG. 4 shows a Y-axis calibration procedure for when the detector holder 23 is in the horizontal posture, and the latter half (steps S101 to S113) of FIG. 4 shows a Y-axis calibration procedure for when the detector holder 23 is in the vertical posture. When performing the calibration to be described below, a human operator sets an optical flat 4a having a cylindrical shape on the stage 11 as the workpiece 4.

Figure 5:
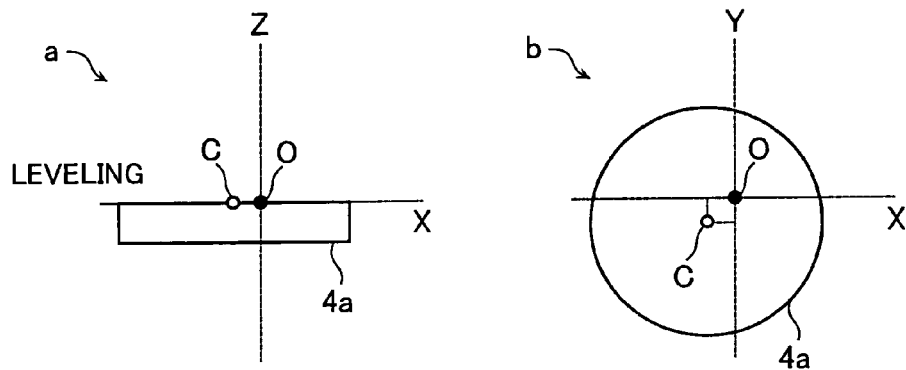
FIG. 5 are schematic diagrams showing step S102 of FIG. 4.

First, the control unit 41 sets the detector holder 23 in the horizontal posture (step S101). Next, the control unit 41 scans the top surface of the set optical flat 4a by making the contact tip 24 trace the surface, and executes a leveling process on the optical flat 4a based on the measurement result (step S102). The leveling process is a process of aligning the top surface of the optical flat 4a horizontally in an X-Y plane defined along the X-axis and the Y-axis, as shown in FIGS. 5 (a) and (b). In the explanation of the present embodiment, the center C of the optical flat 4a is not necessarily required to fall on the center of rotation O of the stage 11.

Figure 6:
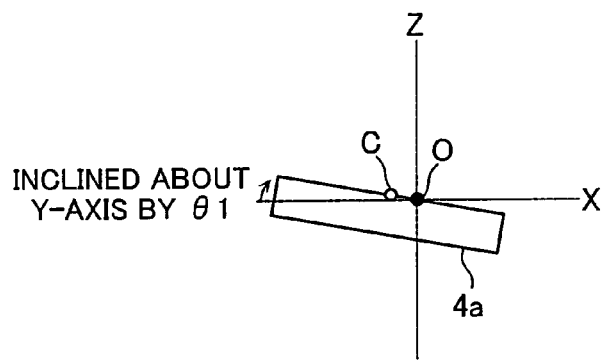
FIG. 6 is a schematic diagrams showing step S103 of FIG. 4.
Figure 7:
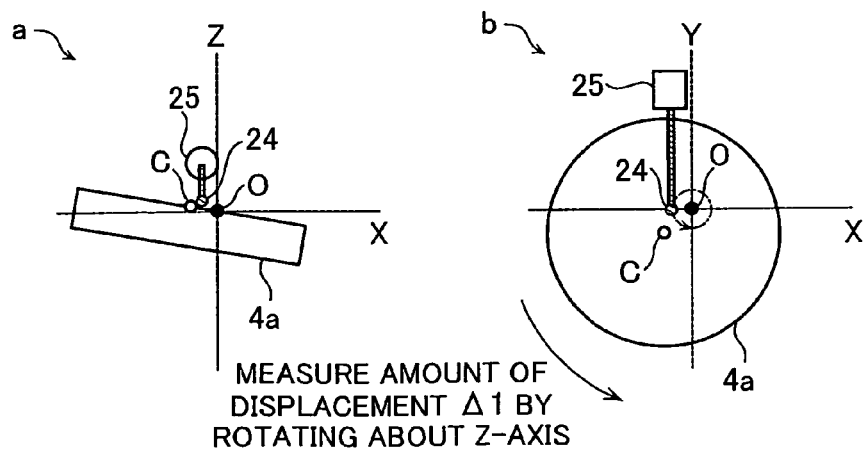
FIG. 7 are schematic diagrams showing step S104 of FIG. 4.

Next, the control unit 41 inclines the stage 11 (or the optical flat 4a) about the Y-axis by a specified angle θ1 as shown in FIG. 6 (step S103). Next, as shown in FIGS. 7 (a) and (b), the control unit 41 makes the contact tip 24 trace the top surface of the optical flat 4a while rotating the stage 11 (or the optical flat 4a) about the Z-axis, and measures an amount of displacement $\Delta 1$ of the contact tip 24 in the Z-axis direction at an angular position of rotation $\phi 1$ (step S104). It is desired that the contact tip 24 trace the top surface at a position more proximal to the center of rotation O. Then, the control unit 41 calculates an angular position of rotation that has the smallest value $\Delta min1$ of the amounts of displacement $\Delta 1$ (such an angular position will be referred to as angular position of rotation with smallest detected value $\phi min1$) (step S105).

Figure 8:
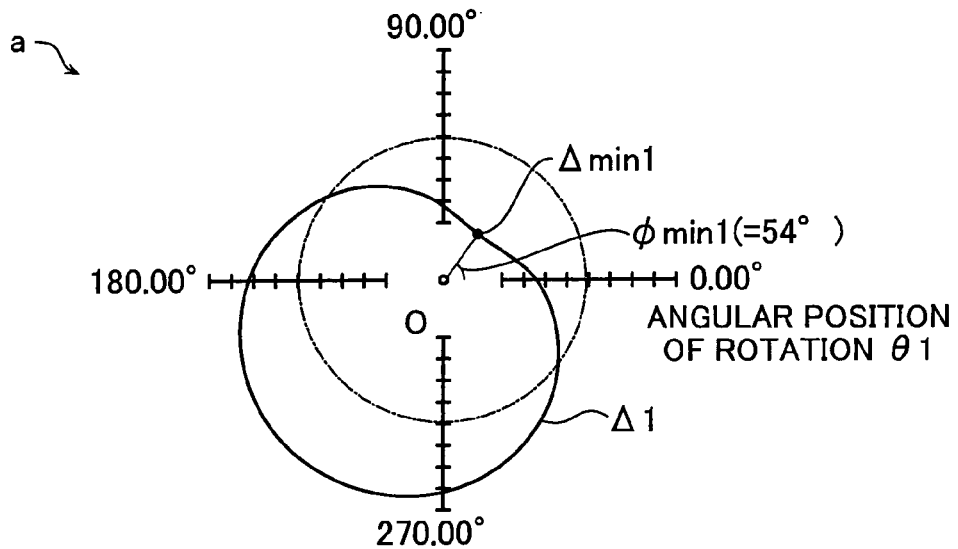
FIG. 8 are schematic diagrams showing steps S105 to S107 of FIG. 4.
Figure 8:
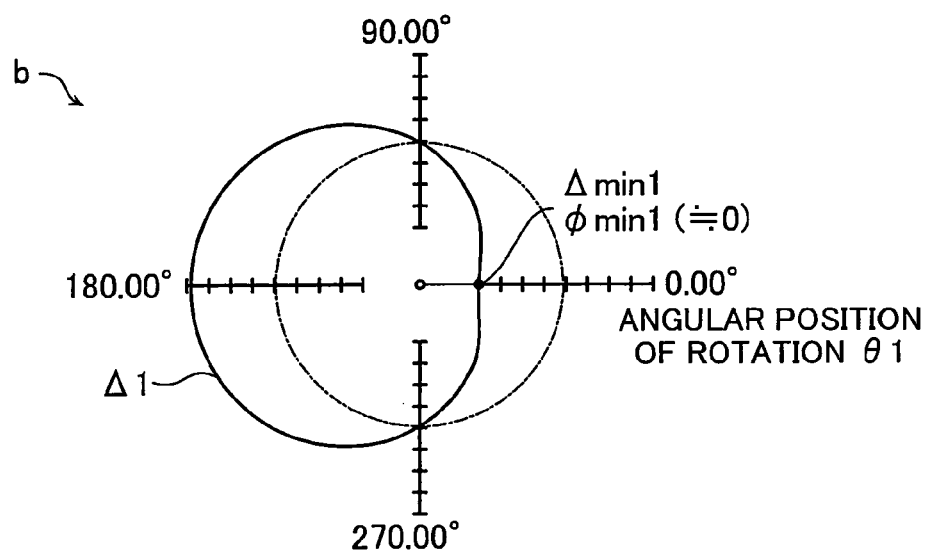

When there is an error in the position of the contact tip 24 in the Y-axis direction (when the contact tip 24 is not positioned on the X-axis), the amount of displacement $\Delta 1$ of the contact tip 24 in the Z-axis direction at the angular position of rotation $\phi 1$ will be, for example, as shown in FIG. 8 (a). That is, during this measurement, for example, the optical flat 4a is inclined about the Y-axis such that a given portion of the optical flat 4a becomes the highest when that portion comes to the 180-degree position. Therefore, if the contact tip 24 is positioned on the X-axis, the amount of displacement $\Delta 1$ takes the largest value when the angular position of rotation $\phi 1$ is 180 degrees, while the amount of displacement $\Delta 1$ takes the smallest value when the angular position of rotation $\phi 1$ is 0 degree. However, when the position of the tip of the contact tip 24 is deviated from the origin in the Y-axis direction as described above, the angular position of rotation with smallest detected value $\phi 1$ is observed at a position deviated from 0 degree, as shown in FIG. 8 (a). In the illustrated example, the angular position of rotation with smallest detected value $\phi min1$ appears at near 54 degrees. This means that the tip of the contact tip 24 measures near the angular position of rotation $\phi 1$ of 306 degrees when the stage 11 is at the angular position of rotation $\phi 1$ of 0 degree, which means that the contact tip 24 is deviated to the negative side of the Y-axis direction.

Subsequent to step S105, the control unit 41 calculates an amount of movement M1 based on the angular position of rotation with smallest detected value $\phi min1$ (step S106). The amount of movement M1 is an amount of movement of the contact tip 24 in the Y-axis direction by which the angular position of rotation with smallest detected value $\phi min1$ will become 0 degree. The human operator corrects the Y-axis direction error of the contact tip 24 in the horizontal direction, by manually adjusting the adjustment screw 27 based on the amount of movement M1.

Next, Y-axis calibration of the contact tip 24 in the vertical posture will be performed. The human operator places a cylindrical workpiece 4b instead of the optical flat 4a on the stage 11. The control unit 41 determines whether or not the replacement of the workpieces 4 has been completed, based on information entered from the operation section 32 (step S107). The cylindrical workpiece 4b is of high accuracy, and has a diameter smaller than that of the optical flat 4a.

Figure 9:
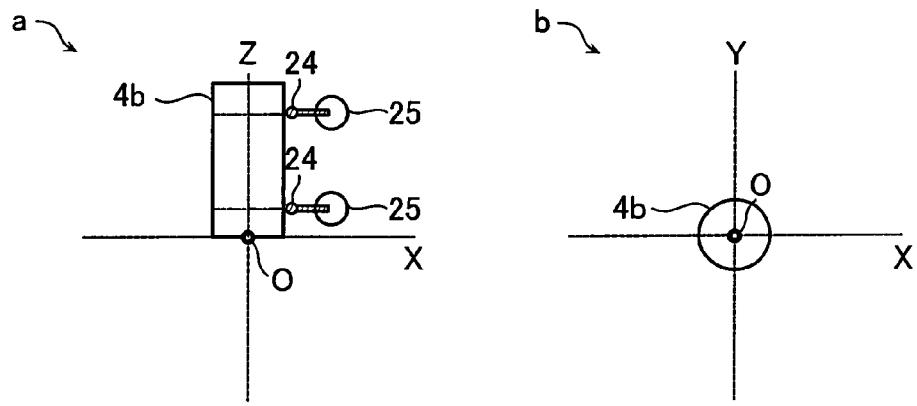
FIG. 9 are schematic diagrams showing step S108 of FIG. 4.

When the cylindrical workpiece 4b is set, the control unit 41 rotates the detector 25 by 90 degrees to put the contact tip 24 in a posture to measure a vertical surface, scans the set cylindrical workpiece 4b by rotatively tracing upper and lower two positions of the side surface, and executes leveling and centering processes on the cylindrical workpiece 4b based on the result of the measurement (step S108). The centering process is a process of aligning the axis of the cylindrical workpiece 4b with the Z-axis as shown in FIGS. 9 (a) and (b). Next, the control unit 41 sets the detector holder 23 in the vertical posture (step S109).

Figure 10:
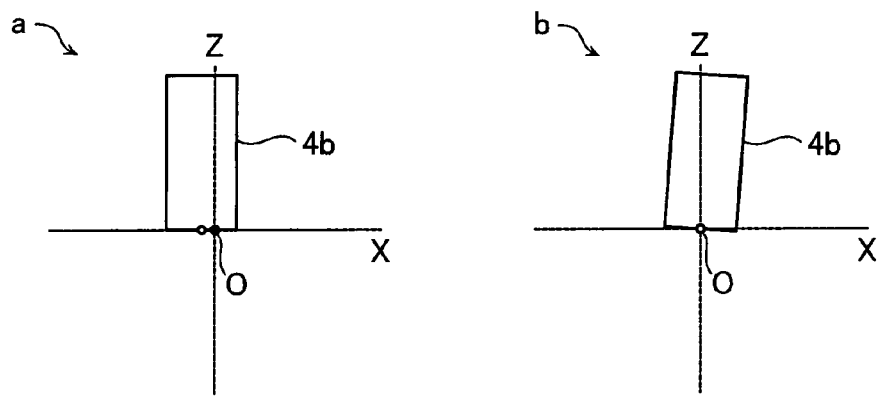
FIG. 10 are schematic diagrams showing step S110 of FIG. 4.

Next, the control unit 41 places the workpiece 4 (cylindrical workpiece 4b) such that its axis is off-centered from the rotation axis O or such that the workpiece 4 is inclined (step S110). For example, the control unit 41 off-centers the position of the axis of the cylindrical workpiece 4b from the Z-axis as shown in FIG. 10 (a). Alternatively, the control unit 41 inclines the cylindrical workpiece 4b about the Y-axis such that the axis thereof is inclined from the Z-axis as shown in FIG. 10 (b).

Figure 11:
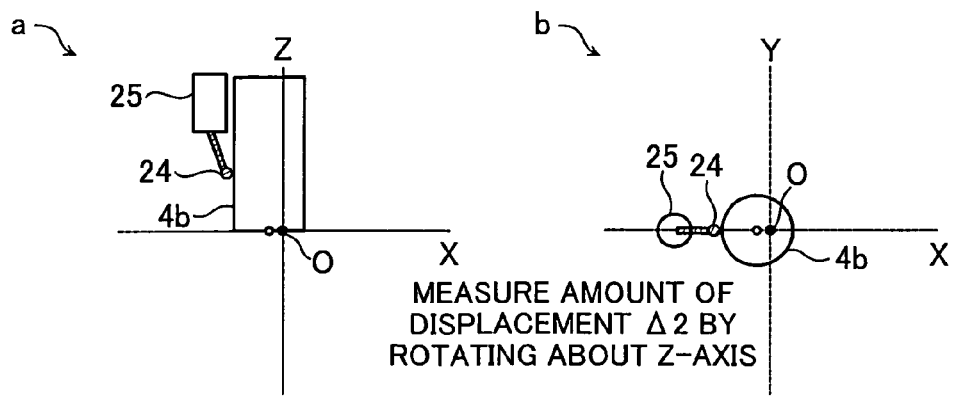
FIG. 11 are schematic diagrams showing step S111 of FIG. 4.

Next, as shown in FIGS. 11 (a) and (b), the control unit 41 makes the contact tip 24 trace the side surface of the cylindrical workpiece 4b while rotating the stage 11 (or the cylindrical workpiece 4b) about the Z-axis, and measures an amount of displacement $\Delta 2$ of the contact tip 24 in the X-axis direction at an angular position of rotation $\phi 2$ (step S111). Next, the control unit 41 calculates the angular position of rotation that has the smallest value $\Delta min2$ of the amounts of displacement $\Delta 2$ (such an angular position will be referred to as angular position of rotation with smallest detected value $\phi min2$) (step S112). When there is an error in the position of the contact tip 24 in the Y-axis direction (when the contact tip 24 is not positioned on the X-axis), the amount of displacement $\Delta 2$ of the contact tip 24 in the X-axis direction at the angular position of rotation $\phi 2$ will be substantially the same as shown in FIG. 8 (a).

Next, the control unit 41 calculates an amount of movement M2 based on the angular position of rotation with smallest detected value $\phi min2$ (step S113). The amount of movement M2 is an amount of movement of the contact tip 24 in the Y-axis direction by which the angular position of rotation with smallest detected value $\phi min2$ will become 0 degree. The human operator corrects the Y-axis direction error of the contact tip 24 in the vertical posture, by manually adjusting the adjustment screw 26 based on the amount of movement M2.

[Advantages of Form Measuring Instrument According to Embodiment]

As described above, the form measuring instrument according to the embodiment adjusts the Y-axis based on the angular positions of rotation with smallest detected value φmin1 and φmin2. That is, the form measuring instrument does not rely only upon human perceptions, and therefore can perform Y-axis direction adjustment highly accurately. Furthermore, the form measuring instrument according to the embodiment needs not measure the workpiece 4 entirely, and hence can perform centering in a short time.

Other Embodiments

Though the embodiment of the form measuring instrument having been explained, the present invention is not limited to the embodiment described above, but various alterations, additions, substitutions, etc. can be made within the scope of the spirit of the invention.

Figure 12:
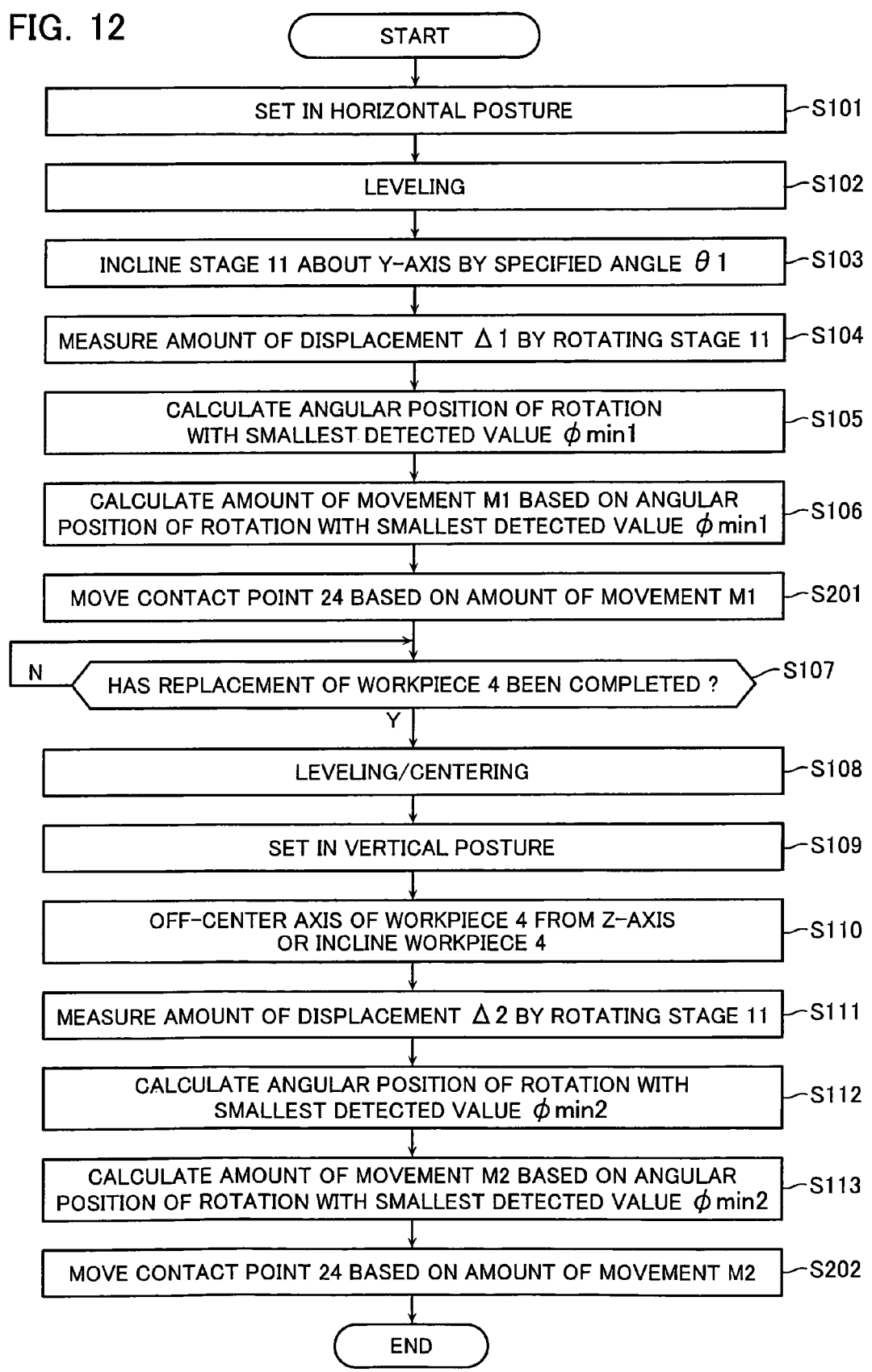
FIG. 12 is a diagram showing an operation of the form measuring instrument according to another embodiment.

The embodiment described above is intended for a human operator to manually adjust an error of the contact tip 24 in the Y-axis direction based on the amounts of movement M1 and M2. However, as shown in FIG. 12, after step S106, the control unit 41 may automatically adjust the Y-axis of the contact tip 24 in the horizontal posture by adjusting the adjustment screw 27 based on the amount of movement M1 (step S201). Also, after step S113, the control unit 41 may automatically adjust the Y-axis of the contact tip 24 in the vertical posture by adjusting the adjustment screw 26 based on the amount of movement M2 (step S202).

In the embodiment described above, a spherical workpiece may be placed instead of the cylindrical workpiece 4b.

What is claimed is:

1. A method of calibrating a form measuring instrument for calibrating a position of a contact tip of the form measuring instrument in a direction along a Y-axis, the form measuring instrument including:
   a table for placement of a workpiece thereon, the table being rotatable about a Z-axis;
   the contact tip capable of contacting with the workpiece; and
   contact tip driving means configured to drive the contact tip in directions along at least an X-axis and the Z-axis among the X-axis, the Y-axis, and the Z-axis perpendicular to one another,
   the method comprising:
   performing tracing measurement of an inclined flat surface, a side surface of an inclined cylinder, or a side surface of an off-centered cylinder by rotating the surface to obtain a measurement value at each angular position of rotation of the table, the inclined surface and the side surface of the inclined cylinder each being a part of the workpiece obtained by inclining the workpiece placed on the table about the Y-axis, the off-centered cylinder having a center axis off-centered in the direction along the X-axis;
   obtaining an angular position of rotation of the table at which a smallest value among the measurement values obtained by the tracing measurement is detected, as an angular position of rotation with smallest detected value; and
   adjusting the position of the contact tip in the direction along the Y-axis based on the angular position of rotation with smallest detected value,
   wherein the contact tip driving means includes:
   a detector which supports the contact tip; and
   a detector holder which supports the detector in a manner to enable the detector to take two postures including a horizontal posture and a vertical posture, and
   wherein the method comprises:
   when the detector is in the horizontal posture, performing tracing measurement of the inclined surface, and adjusting the position of the contact tip in the direction along the Y-axis in the horizontal posture; and
   when the detector is in the vertical posture, performing tracing measurement of the side surface of the inclined cylinder or the side surface of the off-centered cylinder, and adjusting the position of the contact tip in the direction along the Y-axis in the vertical posture.

2. The method of calibrating the form measuring instrument according to claim 1, comprising
   using an optical flat as the workpiece when adjusting the position of the contact tip in the direction along the Y-axis in the horizontal posture.

3. The method of calibrating the form measuring instrument according to claim 2, comprising
   using a workpiece having a diameter smaller than that of the optical flat as the workpiece when adjusting the position of the contact tip in the direction along the Y-axis in the vertical posture.

4. The method of calibrating the form measuring instrument according to claim 3,
   wherein the workpiece is cylindrical or spherical.

5. The method of calibrating the form measuring instrument according to claim 1, comprising
   after adjusting the position of the contact tip in the direction along the Y-axis in the horizontal posture, determining whether or not the workpiece has been replaced, and when the workpiece has been replaced, adjusting the position of the contact tip in the direction along the Y-axis in the vertical posture.

6. A form measuring instrument, comprising:
   a table for placement of a workpiece thereon, the table being rotatable about a Z-axis;
   a contact tip capable of contacting with the workpiece;
   contact tip driving means configured to drive the contact tip in directions along at least an X-axis and the Z-axis among the X-axis, a Y-axis, and the Z-axis perpendicular to one another; and
   a control unit operative to calibrate a position of the contact tip in a direction along the Y-axis,
   the control unit including:
   means operative to obtain an angular position of rotation of the table at which a smallest value among measurement values is detected as an angular position of rotation with smallest detected value, the measurement values being obtained by performing tracing measurement of an inclined flat surface, a side surface of an inclined cylinder, or a side surface of an off-centered cylinder by rotating the surface, the inclined surface and the side surface of the inclined cylinder each being a part of the workpiece obtained by inclining the workpiece placed on the table about the Y-axis, the off-centered cylinder having a center axis off-centered in the direction along the X-axis; and
   means operative to calculate an amount of adjustment by which the position of the contact tip in the direction along the Y-axis is adjusted based on the angular position of rotation with smallest detected value, wherein the contact tip driving means includes:

a detector which supports the contact tip; and a detector holder which supports the detector in a manner to enable the detector to take two postures including a horizontal posture and a vertical posture, and wherein when the detector is in the horizontal posture, the control unit performs tracing measurement of the inclined surface, and adjusts the position of the contact tip in the direction alone the Y-axis in the horizontal posture; and when the detector is in the vertical posture, the control unit performs tracing measurement of the side surface of the inclined cylinder or the side surface of the off-centered cylinder, and adjusts the position of the contact tip in the direction alone the Y-axis in the vertical posture.

7. The form measuring instrument according to claim 6, wherein an optical flat is used as the workpiece for adjusting the position of the contact tip in the direction along the Y-axis in the horizontal posture.

8. The form measuring instrument according to claim 7, wherein a workpiece having a diameter smaller than that of the optical flat is used as the workpiece for adjusting the position of the contact tip in the direction along the Y-axis in the vertical posture.

9. The form measuring instrument according to claim 8, wherein the workpiece is cylindrical or spherical.

10. The form measuring instrument according to claim 6, wherein after adjusting the position of the contact tip in the direction along the Y-axis in the horizontal posture, the control unit determines whether or not the workpiece has been replaced, and when the workpiece has been replaced, the control unit adjusts the position of the contact tip in the direction along the Y-axis in the vertical posture.

* * * * *